United States Patent [19]
Carter

[11] Patent Number: 4,555,083
[45] Date of Patent: Nov. 26, 1985

[54] SCUBA TANK POSITIONER

[76] Inventor: Frank D. Carter, 23 N. Ellis Pl., Newbury Park, Calif. 91320

[21] Appl. No.: 622,981

[22] Filed: Jun. 21, 1984

Related U.S. Application Data

[63] Continuation-in-part of Ser. No. 445,159, Nov. 29, 1982, abandoned.

[51] Int. Cl.$^4$ .................. B60P 7/12; A47G 23/02
[52] U.S. Cl. .................................. 248/313; 248/154; 403/330; 403/381; 410/47
[58] Field of Search ............... 248/73, 154, 205 R, 248/221.3, 221.4, 222.1, 223.1, 224.2, 225.2, 313; 403/330, 381; 410/31, 35, 36, 42, 47, 48, 49

[56] References Cited

U.S. PATENT DOCUMENTS

| | | | |
|---|---|---|---|
| 1,788,464 | 1/1931 | Kederis et al. | 248/224.2 X |
| 2,817,409 | 12/1957 | Cullmann | 248/224.2 X |
| 3,310,270 | 3/1967 | Ciancio | 248/313 X |
| 3,386,695 | 6/1968 | Blood et al. | 248/224.2 X |
| 3,610,092 | 11/1971 | Miller | 403/330 X |
| 3,765,635 | 11/1973 | Burrell et al. | 248/313 |
| 3,817,435 | 6/1974 | De Luca et al. | 248/313 X |
| 4,090,796 | 5/1978 | Okuda et al. | 403/381 X |
| 4,168,007 | 9/1979 | Rohatensky | 248/154 X |

FOREIGN PATENT DOCUMENTS 1332113 11/1963 France .................. 403/381

*Primary Examiner*—Robert B. Reeves
*Assistant Examiner*—David F. Hubbuch
*Attorney, Agent, or Firm*—Jack C. Munro

[57] ABSTRACT

An apparatus to prevent a tank, such as a scuba tank from rolling around on a supporting surface such as the bed of a truck or within the trunk of an automobile. The apparatus comprises a split ring-shaped band which is to be located about the exterior of the scuba tank. The band is attached in a tangential manner to a flat plate. The length of the flat plate is sufficient to laterally support the scuba tank when at rest on the supportive surface and prevent such from rolling around.

4 Claims, 10 Drawing Figures

SCUBA TANK POSITIONER

REFERENCE TO PRIOR APPLICATION

This application is a continuation-in-part of patent application Ser. No. 445,159, filed Nov. 29, 1982, now abandoned by the same title and same inventor.

BACKGROUND OF THE INVENTION

The field of this invention relates to a device to fix the position of a tank, particularly a scuba tank during the time the scuba tank is not being used.

Compressed air tanks, known as scuba tanks, are in extremely common use in underwater diving equipment. These tanks are to be strapped to the back of the user when in use. Frequently, a single diver will have available two or more tanks. Any tank that is not in use is normally laid on the deck of a boat. The inherent rolling action of the boat due to the wave motion of the water can cause the scuba tank to roll from the deck of the boat and submerge.

Additionally, scuba tanks are normally transported to the location of use by some type of vehicle, such as in the bed of a truck or the trunk of an automobile. Movement of the vehicle can frequently cause the scuba tank to "roll around". A scuba tank will normally weigh twenty-five or more pounds. Therefore, this rolling motion makes the scuba tank capable of causing a significant amount of damage to the bed of the truck or the trunk of the automobile. Also, the scuba tank rolling around can cause damage to other pieces of equipment on the boat, such as air regulators.

In the past, others have been aware of this problem. The prior art structure to solve this problem relates to a complex stand which includes compartments within which scuba tanks can be mounted. This type of apparatus is not readily portable and occupies a substantial amount of space. Also, the inherent expense of this prior art type of structure prevents widespread usage.

SUMMARY OF THE INVENTION

The primary objective of this invention is to construct a positioner to be connected to a scuba tank which prevents the scuba tank from rolling around when the tank is located on a supportive surface.

Another objective of this invention is to construct an apparatus which has no moving parts, which can be manufactured inexpensively and utilized at any location to stabilize the position of a scuba tank.

The positioner of this invention takes the form of a ring-shaped band wherein the wall of the band comprises a section of a pipe. The band has a slit formed through the width of the band which provides adjustability for the band and will accommodate slightly different diameters of scuba tanks. The band is to slightly expand when slipped over a scuba tank so as to snugly hold onto the tank. The band is to be attached to a plate which is substantially rectangular in shape. The length of the rectangularly shaped plate is at least equal to the outside diameter of the band. The plate can be integrally attached to the band, or can be removably secured to the band through the use of a dove-tail slot assembly or other similar types of detachable connection arrangement. When removable, there may be incorporated a separate lockable latch assembly to insure against accidental disengagement between the plate and the band.

DETAILED DESCRIPTION OF THE SHOWN EMBODIMENT

Figure 1:
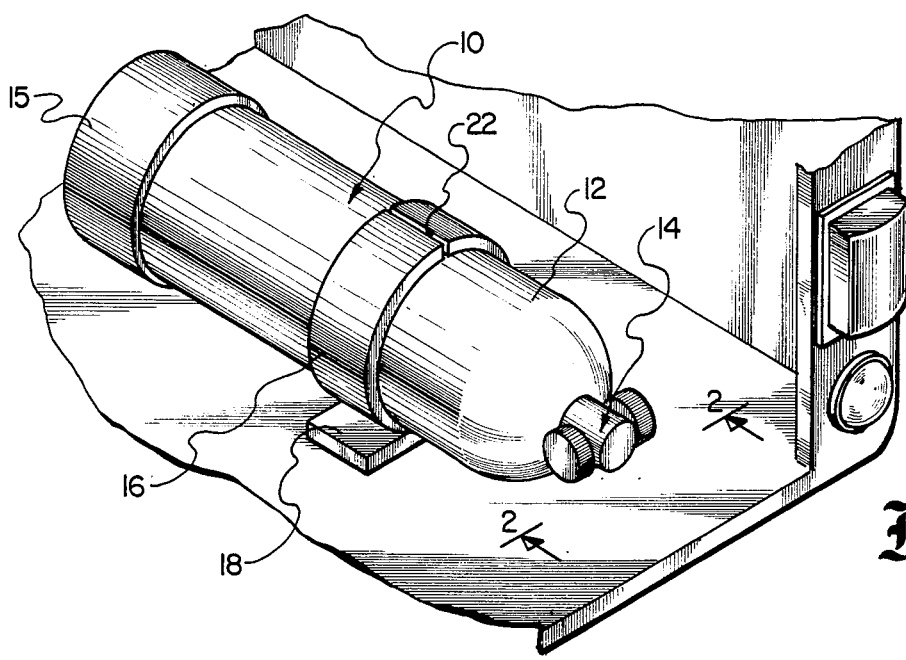
FIG. 1 is an isometric view showing the positioner of this invention attached to a scuba tank and located within the bed of a pickup truck.

Referring particularly to FIG. 1, there is shown a conventional, cylindrically shaped scuba tank 10 which has an exterior wall 12. Attached to the tank 10 is an air valve assembly 14. The tank 10 includes a slightly enlarged base 15. The base 15 will normally be constructed of a nonmetallic material, such as rubber or plastic to prevent scratches within the surface (not shown) upon which it is supported.

Figure 2:
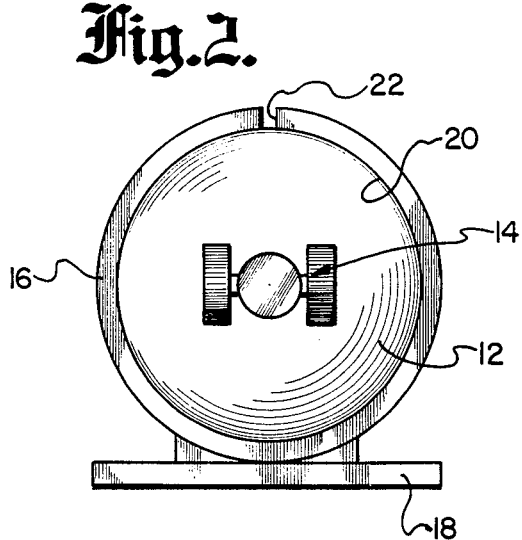
FIG. 2 is an end elevational view of a scuba tank upon which is mounted the positioner of the present invention.
Figure 3:
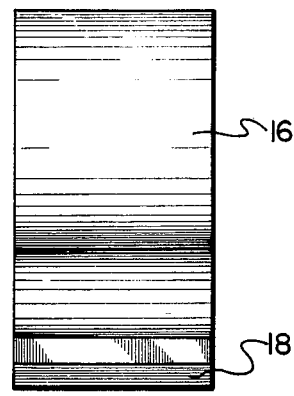
FIG. 3 is a side view of the positioner of this invention.

Referring particularly to FIGS. 1-3, there is shown the positioner of this invention which takes the form of a band 16 and a plate 18. The band 16 is formed of a rigid material of construction, such as a plastic. The preferable thickness of the band 16 would be approximately one quarter to three-eights of an inch. The preferable width of the band 16 would be two to three inches. The band 16 is to define an interior area 20 which is just slightly less in diameter than the exterior diameter of the exterior wall 12 of the tank 10.

The band 16 is to be integrally secured to the plate 18. This integral securement is through conventional plastic welding techniques. Diametrically opposite the securing to the plate 18, there is formed a slit 22 entirely through the width of the band 16. The function of the slit 22 is to permit the band 16 to slightly diametrically expand when located over the exterior wall 12 of the tank 10 thereby forming a snug connection therebetween.

The length of the plate 18 is shown to be substantially equal to the exterior diameter of the band 16. The length of the plate 18 can be increased or could be somewhat decreased without departing from the scope of this invention. It is only desired that a sufficient length of plate 18 be utilized so as to permit the positioner to operate satisfactorily. As long as the length of the plate 18 is sufficient, when the plate 18 is located against the supportive surface with the band 16 being located about the tank 10, the tank 10 will be maintained in a fixed position and will not be permitted to roll around even though there is substantial movement of the supportive surface, such as a truck, automobile or boat.

Figure 4:
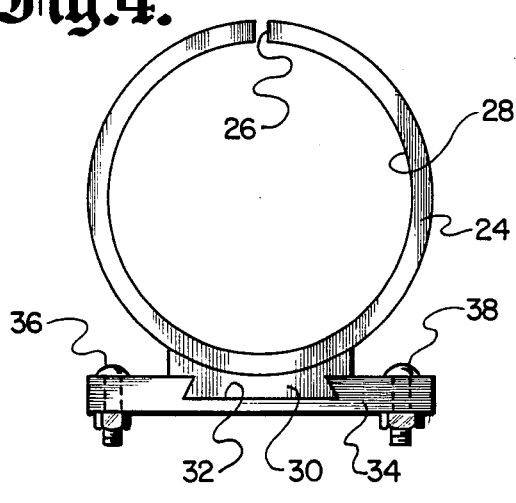
FIG. 4 is a view similar to FIG. 2 but of a first modification showing a detachable connection between the band and the plate of the positioner of this invention.

Referring particularly to FIG. 4, there is shown a first modified form in which there is similarly employed a band 24 which includes slit 26, which defines an interior area 28. The tank 10 is to be located within interior area 28. The band 24 is integrally attached to a male dove-tail protuberance 30. The protuberance 30 is to connect with the female dove-tail slot 32 formed within the plate 34. The plate 34 is designed to be fixedly mounted by bolt fasteners 36 and 38 to a fixed structure such as a vertical wall within a portion of a boat, bed of a truck, etc. In actual practice, the user can have a plurality of the plates 34 located at different desired locations.

Utilizing the structure of FIG. 4, the operator only needs to disengage the male dove-tail member 30 from the female dove-tail slot 32 which then permits the tank 10 to be moved from one location to another. For example, the tank 10 could be moved from a position within the bed of a truck and then when located on a boat, remounted in a similar manner to another plate 34 attached to the structure of the boat.

Figure 5:
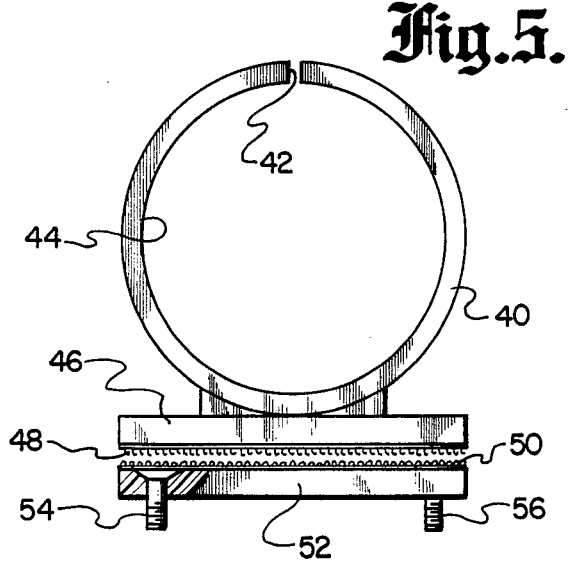
FIG. 5 is a view similar to FIG. 4, but of a second modified form of detachable connection between the band and the plate.

Referring particularly to FIG. 5, a band 40 is shown which includes a slit 42 which defines an interior area 44 and is integrally attached to a mounting plate 46. The inner surface of the mounting plate 46 includes a mass of tiny hooks 48. The hooks 48 are to removably engage with a mass of tiny eyelets 50. The eyelets 50 are attached to a plate 52, which in turn is to be fixedly mounted onto a fixed structure by means of bolt fasteners 54 and 56. The hooks 48 and the eyelets 50 constitute a conventional type of fastening assembly which is generally sold under the tradename of "Velcro". It is to be understood that the structure of FIG. 5 is to be utilized in the same manner as the structure of FIG. 4.

Figure 6:
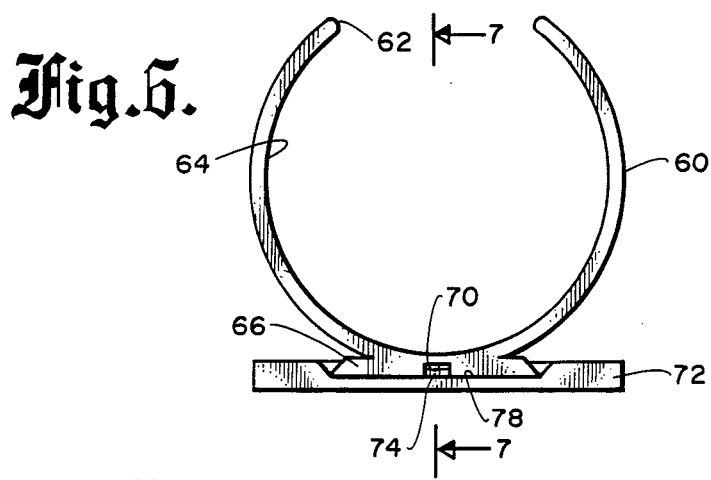
FIG. 6 is a view similar to FIG. 4, but of a front view of a third modified form of this invention showing a locking detent assembly between the band and the plate.
Figures 7, 8:
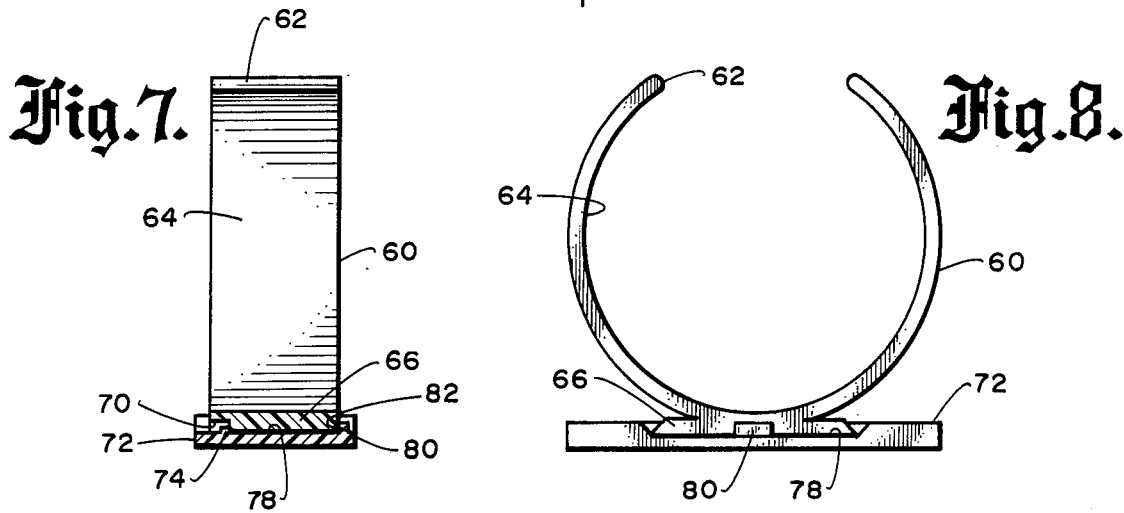
FIG. 7 is a cross-sectional view taken along line 7—7 of FIG. 6.
FIG. 8 is a back view of the third modified form of this invention.

Referring particularly to structures shown in FIGS. 6 to 8 of the drawings, there is shown a third modified version of the invention. The third modified version defines a band 60 which is similar to the band 16. The band 60 has a slit 62, the slit 62 is larger in size than the slit 42. A tank similar to tank 12 is to be inserted within the interior area of 64 of the band 60 so that the band 60 will be somewhat deflected so as to tightly engage the surface of the tank 12.

Integrally connected to the band 60 is a dovetail protuberance 66. Formed within the undersurface of the dovetail protuberance 66 is a recess 70.

The plate 72 has a dovetail slot 78 which is similar to dovetail slot 32. Included within the dovetail slot 78, directly adjacent the outer end thereof, is defined a stop protuberance 80. Directly adjacent the inner end of the dovetail slot 78 is a detent protuberance 74.

When the dovetail protuberance 66 is engaged with the dovetail slot 78, fill engagement occurs when an end of a dovetail protuberance 66 comes into contact with the stop protuberance 80. At such time a locking action occurs with the detent protuberance 74 snapping within the confines of the recess 70.

In order to affect separation of the band 60 from the plate 72, it is only necessary to cause a slight bowing action of the dovetail protuberance 66 which will cause such to bow and cause the detent protuberance 74 to disengage from the recess 70 which will then permit the band 60 to be removed from association with the dovetail slot 78.

Figures 9, 10:
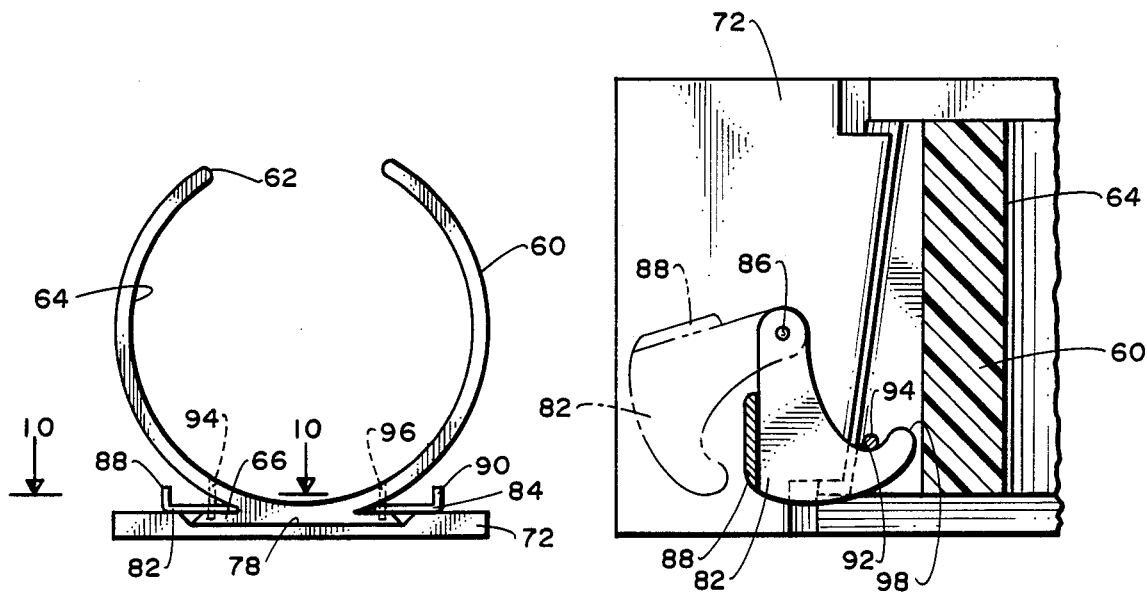
FIG. 9 is a front view similar to that of FIG. 6, but showing the inclusion of a latch assembly to lock together the band and the plate to insure against accidental separation of such.
FIG. 10 is a top plan, partly in cross-section, view of one of the movable lockable latches incorporated within the structure of FIG. 9 taken along line 10—10 of FIG. 9.

Referring particularly to FIGS. 9 and 10, there is shown a structure similar to FIGS. 6 to 8, and like numerals have been utilized to refer to like parts. Included within FIGS. 9 and 10, there is included a latching assembly which includes a first sheet material latching pawl 82 and a second sheet material latching pawl 84. The latching pawl 82 is pivotly mounted by a rivet 86 to the plate 72. In a similar manner the latching pawl 84 will be mounted by a rivet (not shown) onto the plate 72.

It is to be noted that latching pawls 82 and 84 are located in a facing relationship with respect to each other on either side of the dovetail slot 78. In actual construction of latching pawls 82 and 84, they will normally be stamped out of a metallic material in a sheet metal configuration. In order to facilitate manual movement of each of the latching pawls 82 and 84, it is desirable to have an upstanding handle, such as handle 88, integrally attached to the outermost edge of the latching pawl 82. A similar handle 90 is mounted in conjunction with the latching pawl 84. It is to be noted for the latching pawl 82, the handle 88 is bent outward in one direction. In regard to the latching pawl 84, the handle 90 is bent in the opposite direction. Both the handles 88 and 90 are so as to facilitate manual pivoting movement of each of the latching pawls 82 and 84.

The inner end of the latching pawl 82 includes a locking recess 92. The locking recess 92 is to be engageable with a pin 94. The pin 94 is normally constructed of metal and is mounted between the band 60 and the dovetail protuberance 66. A similar pin 96 is also similarly mounted in a manner so as to connect with the latching pawl 84. Movement of the latching pawl 82, so that the pin 94 will engage with recess 92, is such that there is a slight forcing of the enlarged end 98 of the latching pawl 82 over the pin 94 until it engages the recess 92. The reason for this is so that the latching pawl 82 will remain in the latched position with the pin 94 in contact with the recess 92 until the latching pawl 82 is manually moved from the latching position. The same is true with respect with the latching pawl 84. It is to be noted that with using the latching pawls 82 and 84 that it may not be necessary to utilize recess 70 and the protuberance 74.

What is claimed is:

1. In combination with a scuba tank, said scuba tank having a substantially cylindrical wall, a scuba tank positioner for preventing rolling movement of said scuba tank, said positioner comprising:

a ring shaped band formed of a rigid material defining an interior area, said ring shaped band including expanding means for varying the size of said interior area, said expanding means comprising a slit formed within said band extending the entire width through said band;

a substantially planar supporting plate, said plate being constructed of sheet material, said plate having a length and a width, said band being attached by connecting means to said plate, said connecting means comprising a dovetail slot assembly, said band being removable and separable from said plate; and a latching assembly mounted on said plate, said latching assembly comprising at least one latching member, said latching member being pivotally movable on said plate between a latching position and an unlatching position, said band including a pin, said latching member to engage with said pin when in said latching position to thereby fixedly secure said band to said plate.

2. The combination as defined in claim 1 wherein: said slit being located substantially diametrically spaced from said connecting means.

3. The combination as defined in claim 2 wherein: said length of said plate being at least equal to the outside diameter of said band.

4. The combination as defined in claim 3 wherein: therebeing two of said latching members and two of said pins, therebeing a separate said pin for each latching member.

* * * * *